Figure 1:
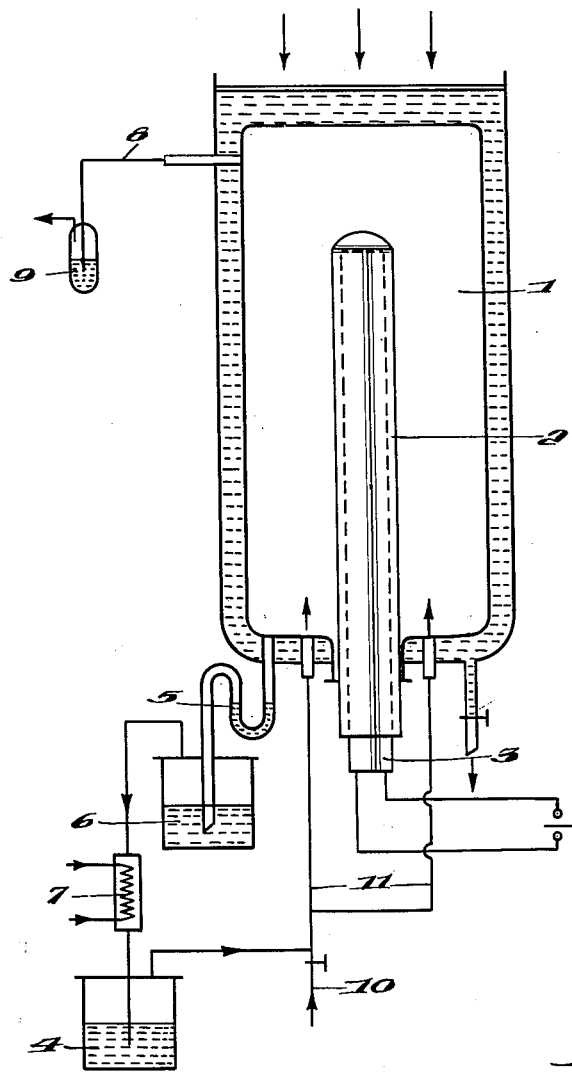

INVENTORS
EDUARD ENK,
JULIUS NICKL,

BY

ATTORNEYS

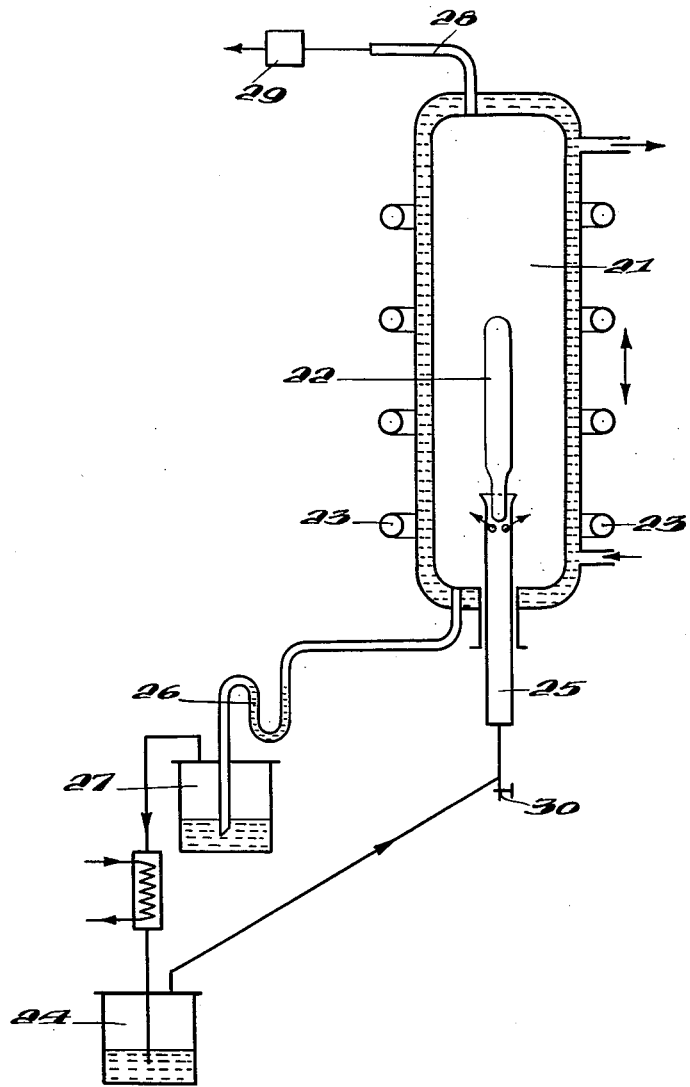

3,023,087
**PROCESS FOR THE PRODUCTION OF
EXTREMELY PURE SILICON**
Eduard Enk and Julius Nickl, Burghausen, Germany,
assignors to Wacker-Chemie G.m.b.H., Munich, Germany
Filed Sept. 4, 1958, Ser. No. 758,973
Claims priority, application Germany Sept. 7, 1957
4 Claims. (Cl. 23—223.5)

The present invention relates to an improved process for the production of extremely pure silicon.

Extremely pure silicon and germanium have primarily served as the starting materials for the production of semiconductor elements. The silicon used for this purpose should be produced in dense crystalline form rather than in amorphous form. This requirement has, however, not been fulfilled in the previously known processes in which silicon-halogen-hydrogen compounds are thermally decomposed as in such processes the silicon is produced as an amorphous powder with high surface activity which absorbs impurities. The amorphous silicon has the further disadvantage in that it must be converted to crystalline form before actual use in the production of semiconductors and further impurities may be taken up by the silicon during such conversion.

According to the invention, a simple process has been found which under certain conditions will render it possible to produce purest crystalline dense silicon which is suitable for the production of semiconductors. The process according to the invention essentially consists in heating a silicon source, such as a silicon halide and hydrogen or a hydrogen containing silicon compound capable of splitting off hydrogen at elevated temperatures, or a silicon-halogen-hydrogen compound alone or in combination with a silicon halide and/or hydrogen, in a limited reaction zone to a temperature between red heat (about 640° C. to about 900° C.) to 1400° C. in a reaction vessel containing cooled surfaces whereby dense crystalline purest silicon is produced and simultaneously continuously withdrawing the by-products and impurities from the neighborhood of such reaction zone and from the reaction vessel with the aid of liquid starting materials and other silicon halides which condense on the cooled portions of the reaction vessel and simultaneously continuously withdrawing the gaseous substances contained in the reaction vessel or produced therein from the reaction vessel. The rapid removal of the by-products and impurities can, for example, be achieved by the condensed vapors of the remaining unconverted starting compounds. The heating of the silicon source in the limited reaction zone of the reaction vessel, for example, can be effected by contact with a locally heated surface.

Di- or trichlorosilanes, as well as tribromosilane, as well as their mixtures with each other or with hydrogen or silicon halides, are most suited as starting material for the process according to the invention. However, silicon tetrahalides or hexahalides can also be used in conjuction with hydrogen or di- or trihalosilanes and the like. When trichlorosilane is used as the starting material, the reaction zone preferably is heated to 850°–1150° C. When dichlorosilane is used, the temperature employed preferably is 800°–1000° C. For tribromosilane, the temperature used preferably is 850°–1030° C. When silicon tetrahalides or silicon hexahalides in combination with hydrogen are used, the temperatures preferably used respectively are 900°–1400° C. and 800°–1300° C. The heated reaction zone in the reaction vessel in the neighborhood of which the impurities, by-products and unconverted starting material are condensed can, for example, be on the walls of the reaction vessel or on a vertical or horizontal shaped body which can, for example, be located in the middle of the reaction vessel. The shaped body can be in the form of a rod or tube or in any other shape. Its shape has no substantial influence upon the process according to the invention. However, it is expedient if such body is rotated. It is essential, however, that the heated surface upon which the silicon is deposited does not deleteriously influence the purity of the silicon produced. It can, for example, consist of silicon, silicon dioxide, silicon carbide or a carbide of another metal. The heated zone within the reaction vessel can move so that the location where the silicon is deposited is changed. When a shaped body is provided within the reaction vessel for the deposit of the silicon, it can be moved or the source of heat can be moved for the same purpose.

The required heat within the reaction vessel can be achieved in various ways, for example, by direct or indirect heating, such as electric resistance heating, high frequency heating, infra red rays or other energy abundant rays, such as electron beams. The reaction vessel can be maintained under super- or subatmospheric pressures during the process according to the invention. Hydrogen and/or an inert gas, such as argon, can also be supplied to the reaction vessel. Preferably, they are caused to flow through the reaction vessel so as to promote the rapid removal of the gaseous reaction products.

The accompanying drawings illustrate apparatus suitable for carrying out the process according to the invention.

In such drawings:

FIG. 1 diagrammatically shows one form of apparatus for carrying out the process according to the invention; and FIG. 2 diagrammatically shows another form of apparatus for carrying out the process according to the invention.

In the embodiment shown in FIG. 1, a reaction vessel 1 is provided, the outer wall of which is cooled by tap water. A closed quartz tube 2 which is heated from the interior by electric resistance heating 3 is provided within reaction vessel 1 as a depositing finger for the silicon produced. An evaporator 4 is provided for the evaporation of the silicon compound, such as silicon chloroform, or silicon compounds employed as the starting material and the saturated silicon chloroform vapors are supplied to the reaction vessel over conduits 11. If hydrogen or an inert gas, such as argon, is also to be supplied to the reaction vessel, these may be supplied through conduit 10. As the vapors pass along the depositing finger 2, they are partially decomposed to silicon and other substances. The condensable portion of the vapors, including non-converted starting material, such as silicon chloroform, condense on the cooled inner wall of reaction vessel 1 and flow down such wall and reach evaporator 6 over liquid seal 5 so that the inner wall is continuously freed of deposited products. The non-converted starting materials, such as silicon chloroform, which is evaporated in evaporator 6 is recycled to evaporator 4 over condenser 7. The higher boiling decomposition products remain in evaporator 6 and can be withdrawn therefrom from time to time or continuously. Eventually, also some finely grained or powdered silicon which is formed in reaction vessel 1 collects in evaporator 6. The light decomposition products which do not condense on the wall of vessel 1, such as, for example, hydrogen, leave the reaction vessel through exhaust conduit 8 which is provided with a mercury seal 9 which simultaneously serves to control the pressure within vessel 1.

In the embodiment shown in FIG. 2, a silicon rod or tube 22 which is heated by high frequency heating, is provided for the deposit of the pure silicon in a cooled double walled quartz reaction vessel 21. The silicon rod or tube is mounted for rotation about its longitudinal axis. The high frequency energy employed for heating such rod or tube is supplied from water cooled copper coil 23. The starting silicon compound, such as silicon chloroform, is vaporized in evaporator 24 and supplied to the reaction vessel 21 through inlet tube 25 and is partially split into silicon and other products on the heated silicon rod or tube 22. The condensable substances produced, together with the non-converted silicon chloroform, are condensed on the cooled wall of reaction vessel 21 and flow into evaporator 27 over liquid seal 26 and the non-converted silicon chloroform is recycled to evaporator 24. The light decomposition products, such as hydrogen, leave reaction vessel 21 over exhaust gas conduit 28 and pressure regulator 29. While the process is carried out the high frequency coil 23 is moved in the direction of the free end of the silicon rod or tube 22 so that the latter is lengthened by the silicon deposited thereon. If desired, hydrogen or an inert gas can be supplied to the reaction vessel over conduit 30.

The apparatus shown in FIG. 1 and FIG. 2 can also be disposed horizontally or be inclined.

The following examples will serve to illustrate several embodiments of the process according to the invention.

*Example 1*

The reaction vessel which was used consisted of an externally cooled closed cylindrical quartz reaction vessel one meter long and 10 cm. in diameter provided with an inlet for the vapors of the silicon compound employed as the starting material and outlets for the gaseous products produced and for the condensate produced, and provided with a coaxially arranged closed quartz tube containing an electric resistance heater and having an outer diameter of 18–20 mm. projecting 80 cm. into the interior of the cylindrical reaction vessel. 10–12 kg. per hour of vaporized silicon chloroform were introduced into such reaction vessel and the electric resistance heater was so regulated that the end of the closed interior quartz tube was maintained at a uniform temperature of 1050° C. The pressure within the reaction tube was 790 mm. Hg. 35 g. of crystallized silicon with a dense structure were deposited per hour. It was of such character that it could be directly used for the production of semiconductors. The unconverted silicon chloroform condensed on the cooled walls of the reaction vessel and carried off the impurities. The condensed silicon chloroform was re-evaporated and recycled.

*Example 2*

The process of Example 1 was repeated employing the same apparatus except that the end of the interior quartz tube was maintained at a uniform temperature of 1390° C. and the pressure maintained in the reaction vessel was 500 mm. Hg. 20–22 g. of crystalline silicon were deposited per hour.

*Example 3*

The process of Example 1 was repeated except that the pressure maintained in the reaction vessel was 1260 mm. Hg rather than 790 mm. Hg. In this instance, 46.5–50 g. of finely crystalline silicon were deposited per hour.

*Example 4*

The process of Example 1 was repeated except that 3 liters per hour of hydrogen or argon were also uniformly supplied to the reaction vessel. When the hydrogen was supplied, 36 g. per hour of crystallized silicon of dense structure were obtained. When the argon was supplied, 32 g. per hour of silicon were obtained.

*Example 5*

The apparatus described in Example 1 was employed and supplied with 6–8 kg. per hour of vaporized dichlorosilane. The end of the closed interior quartz tube was maintained at red heat and the pressure within the reaction vessel was maintained at 780–800 mm. Hg. 43–46 g. of silicon were produced per hour.

*Example 6*

17–21 kg. of vaporized tribromosilane were supplied to the apparatus described in Example 1. The end of the closed interior quartz tube was maintained at a uniform temperature of 1015° C. and a pressure of 700–800 mm. Hg was maintained in the reaction vessel. 44–45 g. of silicon were produced per hour.

*Example 7*

A silicon rod 8 mm. in diameter and 220 mm. long was arranged coaxially in an externally cooled closed cylindrical quartz reaction vessel 30 mm. long and having an inner diameter of 50 mm. provided with an inlet for the starting material and outlets for the gaseous products produced and for the condensate produced. A 150 mm. portion of such silicon rod was heated to 1050° C. by high frequency heating using a coil which could be moved coaxially. When 6–8 kg. per hour of vaporized trichlorosilane were introduced into such reaction vessel and the pressure within the reaction vessel maintained at 800–820 mm. Hg, 16–18 g. of polycrystalline dense silicon were deposited per hour. The diameter and length of the silicon rod increased.

*Example 8*

The process of Example 7 was repeated except that in this instance the silicon rod was moved coaxially instead of the heat source and 5 liters per hour of hydrogen were added to the trichlorosilane vapor. 19 g. per hour of finely crystalline silicon of dense structure were deposited per hour.

*Example 9*

The apparatus described in Example 7 was employed and supplied with 5 kg. per hour of vaporized dichlorosilane at an operating pressure of 1500 mm. Hg without addition of hydrogen. The heated portion of the silicon rod was maintained at 950–1050° C. 12–20 g. of finely crystalline dense silicon were deposited on the rod per hour.

*Example 10*

10–12 kg. of a mixture of equal parts by weight of silicon chloroform and silicon tetrachloride were supplied to the apparatus described in Example 7 while heating the silicon rod to 1250 to 1300° C. 42–43 g. of coarsely crystalline very pure silicon were deposited per hour. Silicon hexachloride was used in place of the silicon tetrachloride with equal success.

*Example 11*

The process of Example 10 was repeated except that 180 liters per hour of hydrogen were also supplied to the reaction vessel. 45–50 g. of coarsely crystalline silicon were deposited per hour.

*Example 12*

10 to 12 kg. of silicon tetrachloride and 140 liters of hydrogen were supplied per hour to the apparatus described in Example 7. The silicon rod was maintained at a temperature of 1250–1300° C. The yield of silicon was 31–33 g. per hour.

The purity of the silicon produced in Examples 1–12 was determined spectronalytically. Even under extreme testing conditions no foreign substances could be found, and consequently the silicon produced is purer than the usual connotation "spectrally pure."

We claim:

1. A process for the production of pure crystalline silicon which comprises contacting trichlorosilane in a reaction vessel with a silicon body out of contact with the walls of said reaction vessel, said silicon body being heated to 850 to 1050° C. by electric high frequency heating, the walls of said reaction vessel being cooled sufficiently to condense vaporous products in the reaction mixture therein and simultaneously continuously removing by-products and impurities from the neighborhood of the heated silicon body with the aid of the liquid products condensing on the cooled walls of the reaction vessel.

2. The process of claim 1 in which said trichlorosilane is admixed with an inert gas.

3. The process of claim 1 in which said heated silicon body is moved during the process.

4. The process of claim 1 in which the source of electric high frequency heating is moved during such process.

References Cited in the file of this patent

UNITED STATES PATENTS

| | | |
|---|---|---|
| 2,441,603 | Storks et al. | May 18, 1948 |
| 2,556,711 | Teal | June 12, 1951 |

FOREIGN PATENTS

| | | |
|---|---|---|
| 745,698 | Great Britain | Feb. 29, 1956 |
| 159,428 | Australia | Oct. 22, 1954 |